(12) United States Patent
Ou

(10) Patent No.: US 7,951,894 B2
(45) Date of Patent: May 31, 2011

(54) SILICONE COMPOSITIONS, ARTICLES, AND METHODS OF MAKING SUCH SILICONE COMPOSITIONS

(75) Inventor: Duan Li Ou, Northboro, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 340 days.

(21) Appl. No.: 12/164,910

(22) Filed: Jun. 30, 2008

(65) Prior Publication Data

US 2009/0005479 A1 Jan. 1, 2009

Related U.S. Application Data

(60) Provisional application No. 60/947,251, filed on Jun. 29, 2007.

(51) Int. Cl.
*C08G 77/20* (2006.01)
*H01B 3/46* (2006.01)
(52) U.S. Cl. .......................... 528/32; 524/264; 428/447
(58) Field of Classification Search .................. 524/264; 528/32
See application file for complete search history.

(56) References Cited

U.S. PATENT DOCUMENTS

| | | | |
|---|---|---|---|
| 4,618,642 A | 10/1986 | Schoenherr | |
| 4,670,530 A | 6/1987 | Beck | |
| 5,397,817 A | 3/1995 | Smith | |
| 5,665,809 A | 9/1997 | Wojtowicz | |
| 5,674,966 A | 10/1997 | Dermott et al. | |
| 5,770,298 A | 6/1998 | Nakamura et al. | |
| 5,859,094 A | 1/1999 | Conway et al. | |
| 2002/0114826 A1 | 8/2002 | Drury | |
| 2003/0228473 A1* | 12/2003 | Benayoun et al. | ............ 428/447 |
| 2004/0222618 A1* | 11/2004 | Azechi et al. | ............. 280/728.1 |

FOREIGN PATENT DOCUMENTS

| | | |
|---|---|---|
| EP | 0409229 A | 1/1991 |
| WO | 2007045692 A | 4/2007 |

* cited by examiner

*Primary Examiner* — Ling-Siu Choi
*Assistant Examiner* — Chun-Cheng Wang
(74) *Attorney, Agent, or Firm* — Abel Law Group, LLP

(57) ABSTRACT

An article includes a silicone formulation and an in situ softening promoter. The silicone formulation has a shore A durometer and the in situ softening promoter decreases the shore A durometer of the silicone formulation by at least about 35%.

26 Claims, No Drawings

SILICONE COMPOSITIONS, ARTICLES, AND METHODS OF MAKING SUCH SILICONE COMPOSITIONS

CROSS-REFERENCE TO RELATED APPLICATIONS

The present application claims priority from U.S. Provisional Patent Application No. 60/947,251, filed Jun. 29, 2007, entitled "SILICONE COMPOSITIONS, ARTICLES, AND METHODS OF MAKING SUCH SILICONE COMPOSITIONS," naming inventor Duan L. Ou, which application is incorporated by reference herein in its entirety.

FIELD OF THE DISCLOSURE

This disclosure, in general, relates to a silicone composition, articles made from the silicone composition, and methods for making the silicone composition.

BACKGROUND

Curable silicone compositions are used in a variety of applications that range from the automotive industry to medical devices. Typical commercial formulations of liquid silicone rubber (LSR) compositions include a multi-component mixture of a vinyl-containing polydiorganosiloxane, a hydrogen-containing polydiorganosiloxane, catalyst, and filler. Often, the commercial formulation is a two-part formulation that is mixed together prior to use. Once the commercial formulation is mixed, the silicone composition is subsequently molded or extruded and vulcanized.

In many cases, silicone compositions having low durometer are needed for various applications. In some instances, the silicone formulation is modified to provide a silicone formulation having a low durometer. Typically, a lower percentage of silica filler is used to lower the durometer, which leads to a large reduction in the viscosity of the formulation. The resulting low viscosity silicone formulation is difficult to process in conventional silicone fabrication equipment. In addition, manufacturers of products that use such silicone formulations are limited in their ability to customize such formulations to better suit a particular product or process. As a result, manufacturers are often left to choose between desired durometer and desired viscosity, without an option to acquire both.

As such, an improved silicone composition and method of manufacturing silicone compositions would be desirable.

SUMMARY

In a particular embodiment, an article includes a silicone formulation and an in situ softening promoter. The silicone formulation has a shore A durometer and the in situ softening promoter decreases the shore A durometer of the silicone formulation by at least about 35%.

In an exemplary embodiment, a silicone composition includes a polyalkylsiloxane and an in situ softening promoter. The silicone composition has a shore A durometer of less than about 40 and a viscosity greater than about 500 Pa·s.

In a further exemplary embodiment, a method of making a silicone composition includes mixing a silicone formulation in a mixing device and adding an in situ softening promoter to the mixing device.

DETAILED DESCRIPTION

In a particular embodiment, a silicone composition includes a silicone formulation and an in situ softening promoter, such as a silsesquioxane. The incorporation of the in situ softening promoter into the silicone formulation provides a silicone composition that has a desirable durometer (Shore A). In particular, a desirable durometer may be achieved without a loss of viscosity. The silicone composition is typically prepared by homogeneously mixing the in situ softening promoter with the silicone formulation using any suitable mixing method. "In situ" as used herein refers to mixing the softening promoter and the silicone formulation prior to vulcanization of the silicone rubber.

In an exemplary embodiment, the silicone formulation may include a non-polar silicone polymer. The silicone polymer may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polydimethylsiloxane. In a further embodiment, the polyalkylsiloxane is a vinyl-containing polydimethylsiloxane. In yet another embodiment, the silicone polymer is a combination of a hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

Typically, the silicone polymer in the silicone formulation is elastomeric. For example, the durometer (Shore A) of the silicone formulation before the addition of the softening promoter is less than about 80, such as about 1 to 70, about 20 to about 50, about 30 to about 50, about 40 to about 50, or about 1 to about 10.

In an exemplary embodiment, the silicone composition includes an in situ softening promoter such as a silsesquioxane. For instance, the silsesquioxane may include a vinyl-containing silsesquioxane. For example, the vinyl-containing silsesquioxane may include $RSiO_{3/2}$ units, wherein R is a vinyl group, an alkyl group, an alkoxy group, a phenyl group, or any combination thereof Typically, the silsesquioxane has a vinyl content of at least about 30.0% by weight. In an embodiment, the alkyl or alkoxy group includes a $C_{1-6}$ hydrocarbon group, such as a methyl, ethyl, or propyl group. The in situ softening promoter may include $R_2SiO_{2/2}$ units, $R_3SiO_{1/2}$ units and $SiO_{4/2}$ units, wherein R is an alkyl radical, alkoxy radical, phenyl radical, or any combination thereof. In an embodiment, the vinyl-containing silsesquioxane may include pre-hydrolyzed silsesquioxane prepolymers, monomers, or oligomers.

Typically, the addition of the in situ softening promoter to the silicone formulation is detectable using nuclear magnetic resonance (NMR). The $^{29}Si$ NMR spectra of the silicone formulation typically has two groups of distinguished peaks at about −65 ppm to about −67 ppm and about −72 ppm to about −75 ppm, which corresponds to $ViSiO_{2/2}$ (OH) units and $ViSiO_{3/2}$ units, respectively.

In addition, the silsesquioxane may have desirable processing properties, such as viscosity. In particular, the viscosity may provide for improved processing in situ, such as during silicone formulation mixing or extrusion. For example, the viscosity of the silsesquioxane may be about 1.0 centistokes (cSt) to about 8.0 cSt, such as about 2.0 cSt to about 4.0 cSt, or about 3.0 cSt to about 7.0 cSt. In an example, the viscosity of the silsesquioxane may be up to about 100.0 cSt, or even greater than about 100.0 cSt.

Generally, the in situ softening promoter is present in an effective amount to decrease the original shore A durometer of the silicone formulation. The addition of the softening promoter decreases the shore A durometer of the silicone formulation by at least about 35%, such as at least about 40%, such as at least about 50%, at least about 75%, or at least about 85%. After the addition of the softening promoter, the shore A durometer of the silicone composition may be less than about 40, such as less than about 35, such as less than about 30, such as about 1 to 30, about 5 to about 15, or about 1 to about 5. In an embodiment, an "effective amount" is about 0.1 weight % to about 5.0 weight %, or about 0.2 wt % to about 1.0 wt % of the total weight of the silicone polymer.

In addition to a desirable shore A durometer, the silicone compositions including the in situ softening promoter have desirable physical properties such as viscosity. Viscosity is determined at a temperature of about 25° C. For example, the silicone composition may have a viscosity greater than about 500 Pa·s, such as at least about 750 Pa·s, such as at least about 1000 Pa·s, at least about 1100 Pa·s, or even at least about 10,000 Pa·s. In an example, the silicone composition may have a viscosity of about 500 Pa·s to about 2000 Pa·s, such as about 1000 Pa·s to about 1500 Pa·s. Particular embodiments of the silicone composition exhibit a desirable combination of durometer and viscosity, such as exhibiting a shore A durometer of less than about 30 and a viscosity greater than about 500 Pa·s. The addition of the in situ softening promoter provides a desirable viscosity such that the silicone composition is physically substantial for convenient handling and use.

The silicone composition may further include a catalyst and other optional additives. Exemplary additives may include, individually or in combination, fillers, inhibitors, colorants, and pigments. In an embodiment, the silicone formulation is a platinum catalyzed silicone formulation. Alternatively, the silicone formulation may be a peroxide catalyzed silicone formulation. In another example, the silicone formulation may be a combination of a platinum catalyzed and peroxide catalyzed silicone formulation. The silicone formulation may be a room temperature vulcanizable (RTV) formulation or a gel. In an example, the silicone formulation may be a silicone gel without any filler. In an example, the silicone formulation may be a liquid silicone rubber (LSR) or a high consistency gum rubber (HCR). In a particular embodiment, the silicone formulation is a platinum catalyzed LSR. In a further embodiment, the silicone formulation is an LSR formed from a two-part reactive system. The liquid silicone rubber may be processed by any suitable method such as compression molding, overmolding, liquid injection molding, or transfer molding.

The silicone formulation may be a conventional, commercially prepared silicone polymer. The commercially prepared silicone polymer typically includes the non-polar silicone polymer, a catalyst, a filler, and optional additives. "Conventional" as used herein refers to a commercially prepared silicone polymer that is free of any moiety or additive to decrease the durometer of the composition. Particular embodiments of conventional, commercially prepared LSR include Rhodia Silbione® LSR 4330 by Rhodia Silicones of Ventura, Calif.

In an exemplary embodiment, a conventional, commercially prepared silicone polymer is available as a two-part reactive system. Part 1 typically includes a vinyl-containing polydialkylsiloxane, a filler, and catalyst. Part 2 typically includes a hydride-containing polydialkylsiloxane and optionally, a vinyl-containing polydialkylsiloxane and other additives. A reaction inhibitor may be included in Part 1 or Part 2. Mixing Part 1 and Part 2 by any suitable mixing method produces the silicone formulation. In an embodiment, the in situ softening promoter, such as the silsesquioxane, is added to the mixed two-part system or during the process of mixing the two-part system. As stated earlier, the in situ softening promoter is added to the conventional, commercially prepared silicone polymer prior to vulcanization. In an exemplary embodiment, the two-part system and the in situ softening promoter are mixed in a mixing device. In an example, the mixing device is a mixer in an injection molder. In another example, the mixing device is a mixer, such as a dough mixer, Ross mixer, two-roll mill, or Brabender mixer. In contrast to adding the in situ softening promoter during or after mixing and prior to vulcanization, typical low durometer silicone compositions that are commercially available incorporate an additive during an earlier stage of preparing the silicone rubber. Typically, the additive is incorporated into the precursor while preparing the polyalkylsiloxane, and often, modifies the polyalkylsiloxane chain.

Once the silicone composition includes the in situ softening promoter, the silicone composition may be subjected to a post-cure treatment, such as a thermal treatment or radiative curing. Thermal treatment typically occurs at a temperature of about 125° C. to about 200° C. In an embodiment, the thermal treatment is at a temperature of about 150° C. to about 180° C. Typically, the thermal treatment occurs for a time period of about 5 minutes to about 10 hours, such as about 10 minutes to about 30 minutes, or alternatively about 1 hour to about 4 hours.

In an embodiment, radiation crosslinking or radiative curing may be performed once the silicone composition is formed. The radiation may be effective to crosslink the silicone composition. The intralayer crosslinking of polymer molecules within the silicone composition provides a cured composition and imparts structural strength to the silicone composition. In a particular embodiment, the radiation may be ultraviolet electromagnetic radiation having a wavelength between 170 nm and 400 nm, such as about 170 nm to about 220 nm. In an example, crosslinking may be affected using at least about 120 J/cm$^2$ radiation.

In particular, the silicone compositions including the in situ softening promoter and the process for formulating such a composition may advantageously produce low durometer silicone elastomers having desirable physical and mechanical properties. Advantageous physical properties include for example, improved elongation-at-break, tensile strength, or tear strength. Elongation-at-break and tensile strength are determined using an Instron instrument in accordance with ASTM D-412 testing methods. For example, the silicone composition may exhibit an elongation-at-break of at least about 600%, such as at least about 700%, at least about 800%, or even at least about 850%. In an embodiment, the tensile strength of the silicone composition is less than about 1000 psi, and in particular, is less than about 500 psi, such as less than about 400 psi. In an embodiment, the tensile strength of the silicone composition is about 100 psi to about 500 psi, such as about 150 psi to about 400 psi. Further, the silicone composition may have a tear strength greater than about 2 ppi, such as at least about 30 ppi, such as at least about 50 ppi, or even at least about 80 ppi.

Applications for the silicone compositions are numerous. The silicone composition may be used for any application or article where low durometer is desired. For instance, the silicone composition may be used for microelectronic applications, such as to encapsulate microelectronic components; vibration absorption applications, such as for vibration dampening; shoe-insert applications, such as a replacement for commercially-available silicone gel; soft touch applications, such as for handle and grip; and cushion applications, such as for shock-absorption.

EXAMPLE 1

This Example illustrates the process to synthesize an in-situ softening promoter (ISP). A solution including 200 grams (g) of diethyl ether, 9.63 g (0.065 mol) of vinyltrimethoxysilane (Sigma Aldrich) and 3.8 g (0.035 mol) of trimethylchlorosilane (Sigma Aldrich) is mixed with 100 g of water for one hour at ambient conditions. After removal of the aqueous layer, the organic layer is washed with distilled water for four times to provide a neutral pH. The residual water in the organic layer is removed by anhydrous magnesium sulfate. A viscous liquid is obtained (7.2 g) after evaporating off the solvent in a rotary evaporator.

EXAMPLE 2

This Example illustrates the process to prepare low durometer LSR. Five formulations are prepared for a performance study. Specifically, three vinyl-containing silsesquioxanes are added to two commercial LSR formulations. The first vinyl-containing silsesquioxane is the in-situ softening promoter discussed in Example 1. The other two vinyl-containing silsesquioxanes are commercially available from Gelest. The silicon LSRs are Rhodia product Silbione® 4330 and 4305. Composition data is illustrated in Table 1. The vinyl-containing silsesquioxanes are incorporated easily into the LSRs during the two part mixing step, using a dough mixer. The additive loading level is between about 0.5% to 1% by weight of LSR (phr, part per hundred part of rubber).

TABLE 2

Example Formulations

| | Matrix | Additive | % of additive (phr) |
|---|---|---|---|
| Composition 1 | Silbione 4330 | Example 1 | 0.75 |
| Composition 2 | Silbione 4330 | VPE-005 | 1.0 |
| Composition 3 | Silbione 4330 | VEE-005 | 0.4 |
| Composition 4 | Silbione 4330 | VEE-005 | 0.5 |
| Composition 5 | Silbione 4330 | VEE-005 | 0.7 |
| Composition 6 | Silbione 4305 | VEE-005 | 0.3 |
| Reference material 1 | Silbione 4330 | N/A | N/A |
| Reference material 2 | Silbione 4305 | N/A | N/A |

EXAMPLE 3

The mechanical properties of the six compositions and the comparative reference materials are evaluated. Test slabs are compression molded at 177° C. for 5 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240. Viscosity measurements are performed on a TA Instrument ARES rotational rheometer at 1 Hz frequency and 25° C. The results are summarized in Table 3.

TABLE 3

Properties of Silicone Compositions

| | Durometer (shore A) | Tensile strength (psi) | Elongation (%) | 200% modulus (psi) | Tear strength (ppi) | Viscosity (Pa·s) |
|---|---|---|---|---|---|---|
| Composition 1 | 7 | 490 | 876 | 84 | 91 | 1128 |
| Composition 2 | 7 | 318 | 820 | 31 | 67 | 1042 |
| Composition 3 | 15 | 468 | 857 | 80 | 87 | — |
| Composition 4 | 8 | 326 | 817 | 34 | 58 | 1152 |
| Composition 5 | 5 | 196 | 630 | 56 | 33 | — |
| Composition 6 | 1 | 138 | 819 | 20 | 2.3 | — |
| Reference material 1 | 32 | 1110 | 766 | 202 | 121 | 1279 |
| Reference material 2 | 6 | 346 | 868 | 38 | 49 | 35 |

The in-situ softening promoter is used to convert conventional LSRs into low durometer LSRs. As seen with Compositions 1 through 6, the softness of the resulting rubber can be controlled with the amount of in situ softening promoter. The resulting low durometer LSRs have shore A durometers ranging from 1 to 15. The addition of the in situ softening promoters to Formulations 1 through 5 decrease the shore A durometers by at least 53% compared to Reference Material 1. Further, Formulations 1, 2, and 4 have viscosities greater than 1000 Pa·s. Compared to Reference Material 2, the addition of the in situ softening promoter to Composition 6 decreases the shore A durometer by 83%. Hence, the in situ softening promoters can be added to the commercially available LSRs to produce low durometer silicone compositions. Further, the addition of the in situ softening promoters produce silicone compositions with desirable viscosities and excellent handling properties.

EXAMPLE 4

This Example illustrates the process to prepare low durometer HCR. One formulation is prepared for a performance study. Specifically, a vinyl-containing silsesquioxane is added to a commercial HCR formulation as an in-situ softening promoter. The vinyl-containing silsesquioxane is a commercially available material from Gelest. The silicone HCR is Momentive product Sanitech® 50. Composition data is illustrated in Table 4. The vinyl-containing silsesquioxanes is incorporated easily into the HCR during the two part mixing step, using a two-roll mill. The additive loading level is at 1% by weight of HCR (phr, part per hundred part of rubber).

TABLE 4

Example Formulations

| | Matrix | Additive | % of additive (phr) |
|---|---|---|---|
| Composition 7 | Momentive Sanitech 50 | VEE-005 | 1.0 |
| Reference material 3 | Momentive Sanitech 50 | N/A | N/A |

EXAMPLE 5

The mechanical properties of composition 7 and the reference materials are evaluated. Test slabs are compression molded at 177° C. for 5 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240. Viscosity measurements are performed on a TA Instrument ARES rotational rheometer at 1 Hz frequency and 25° C. The results are summarized in Table 5.

TABLE 5

Properties of Silicone Compositions

| | Durometer (shore A) | Tensile strength (psi) | Elongation (%) | 200% modulus (psi) | Tear strength (ppi) | Viscosity (Pa·s) |
|---|---|---|---|---|---|---|
| Composition 7 | 35 | 1196 | 897 | 298 | 178 | 11450 |
| Reference material 3 | 57 | 279 | 810 | 407 | 203 | 12698 |

The in-situ softening promoter is used to convert conventional HCRs into low durometer HCRs. As seen with Composition 7, the softness of the resulting rubber can be controlled with the amount of in situ softening promoter. The resulting low durometer HCRs have shore A durometers ranging from 10 to 40. The addition of the in situ softening promoter to Formulation 7 decreases the shore A durometers by at least 38% compared to its matrix, Reference Material 3. Further, Formulation 7 has a viscosity similar to Reference Material 3 and can be processed in the same manner. Hence, the in situ softening promoter can be added to commercially available HCRs to produce low durometer silicone compositions. Further, the addition of the in situ softening promoter produces silicone compositions with desirable viscosities and excellent handling properties.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An article comprising:
    a silicone formulation having a shore A durometer; and
    an in situ softening promoter, wherein the in situ softening promoter is a vinyl-containing silsesquioxane that contains $RSiO_{3/2}$ units wherein R is an alkyl, an alkoxy, a phenyl group, or any combination thereof, the vinyl content of at least about 30.0% by weight and wherein the in situ softening promoter decreases the shore A durometer of the silicone formulation by at least about 35%.

2. The article of claim 1, wherein the addition of the in situ softening promoter decreases the shore A durometer of the silicone formulation by at least about 50%.

3. The article of claim 1, having a shore A durometer of less than about 40.

4. The article of claim 1, having a viscosity greater than about 500 Pa·s prior to vulcanization.

5. The article of claim 4, having a viscosity of about 500 Pa·s to about 2000 Pa·s prior to vulcanization.

6. The article of claim 1, wherein the in situ softening promoter is present in an amount of about 0.1 wt % to about 5.0 wt % of the total weight of the silicone formulation.

7. The article of claim 1, wherein the silicone formulation comprises a polyalkylsiloxane.

8. The article of claim 7, wherein the silicone formulation further comprises a catalyst and a filler.

9. The article of claim 7, wherein the polyalkylsiloxane is platinum-catalyzed.

10. The article of claim 7, wherein the polyalkylsiloxane is liquid silicone rubber (LSR).

11. The article of claim 7, wherein the polyalkylsiloxane is high consistency gum rubber (HCR).

12. The article of claim 1, having an elongation-at break of at least about 600%.

13. The article of claim 1, having a tensile strength of about 100 psi to about 500 psi.

14. The article of claim 1, having a tear strength of at least about 2 ppi.

15. The article of claim 14, having a tear strength of at least about 30 ppi.

16. A silicone composition comprising:
    a polyalkylsiloxane and an in situ softening promoter, wherein the in situ softening promoter is a vinyl-containing silsesquioxane that contains $RSiO_{3/2}$ units wherein R is an alkyl, an alkoxy, a phenyl group, or any combination thereof, the vinyl content of at least about 30.0% by weight and wherein the silicone composition has a shore A durometer of less than about 40 and a viscosity greater than about 500 Pa·s prior to vulcanization.

17. A method of making a silicone composition comprising:
    mixing a silicone formulation in a mixing device; and
    adding an in situ softening promoter to the mixing device, wherein the in situ softening promoter is a vinyl-containing silsesquioxane that contains $RSiO_{3/2}$ units wherein R is an alkyl, an alkoxy, a phenyl group, or any combination thereof, the vinyl content of at least about 30.0% by weight.

18. The method of claim 17, wherein adding the in situ softening promoter decreases the shore A durometer of the silicone formulation by at least about 35%.

19. The method of claim 17, further comprising the step of vulcanizing said silicone composition.

20. The method of claim 17, wherein the in situ softening promoter is added in an amount of about 0.1 wt % to about 5.0 wt % of the total weight of the silicone formulation.

21. The silicone composition of claim 16, wherein the in situ softening promoter is present in an amount of about 0.1 wt % to about 5.0 wt % of the total weight of the silicone composition.

22. The silicone composition of claim 16, wherein the polyalkylsiloxane is platinum-catalyzed.

23. The silicone composition of claim 16, wherein the polyalkylsiloxane is liquid silicone rubber (LSR).

24. The silicone composition of claim 16, wherein the polyalkylsiloxane is high consistency gum rubber (HCR).

25. The method of claim 17, wherein the silicone formulation comprises at least one polyalkylsiloxane.

26. The method of claim 25, wherein the silicone formulation further comprises a catalyst and a filler.

* * * * *